United States Patent [19]
Griffin

[11] Patent Number: 5,161,482
[45] Date of Patent: Nov. 10, 1992

[54] AUTOMATIC MILKING APPARATUS

[75] Inventor: Tony K. Griffin, Leafield, England

[73] Assignee: British Technology Group Limited, London, England

[21] Appl. No.: 707,132

[22] Filed: May 31, 1991

[30] Foreign Application Priority Data

Jun. 1, 1990 [GB] United Kingdom ............... 9012325
Sep. 26, 1990 [GB] United Kingdom ............... 9020952

[51] Int. Cl.⁵ ................................ A01J 3/00
[52] U.S. Cl. ................................ 119/14.02; 119/14.47
[58] Field of Search ............ 119/14.02, 14.08, 14.18, 119/14.36, 14.47, 14.48, 14.49, 14.50, 14.51, 14.52, 14.53, 14.54, 14.55

[56] References Cited

U.S. PATENT DOCUMENTS

| | | | |
|---|---|---|---|
| 2,944,514 | 7/1960 | Nesseth | 119/14.47 |
| 3,482,547 | 12/1969 | Maier . | |
| 4,558,843 | 12/1985 | Hoefelmayr . | |
| 4,840,141 | 6/1989 | Marshall | 119/14.47 |
| 4,924,809 | 5/1990 | Verbrugge | 119/14.02 |
| 4,936,254 | 6/1990 | Marshall | 119/14.47 |

FOREIGN PATENT DOCUMENTS

| | | |
|---|---|---|
| 131646 | 1/1985 | European Pat. Off. . |
| 163483 | 12/1985 | European Pat. Off. . |
| 246759 | 11/1987 | European Pat. Off. . |
| 1632935 | 8/1971 | Fed. Rep. of Germany . |
| 6707881 | 12/1967 | Netherlands . |
| 7016140 | 5/1971 | Netherlands . |
| 1265633 | 3/1972 | United Kingdom . |

*Primary Examiner*—Gene Mancene
*Assistant Examiner*—Thomas Price
*Attorney, Agent, or Firm*—Cushman, Darby & Cushman

[57] ABSTRACT

An automatic milking system milks cows using a combination of hydraulic and conventional milking techniques. The system has at least one teat cup which is placed over a cow's teat. Pressure in the teat cup is controlled to induce milking of the teat. The system has a regulator which maintains the pressure in the uppermost region of the teat cup at approximately atmospheric pressure throughout the milking process. In this way, discomfort to the cow and other adverse effects of the milking process can be avoided.

18 Claims, 5 Drawing Sheets

AUTOMATIC MILKING APPARATUS

The present invention relates to automatic milking apparatus and is applicable both to conventional milking machines, as used during the last sixty years or so, and to the "hydraulic" milking machines of GB 2159685 (National Research Development Corporation).

The basic components of a milking installation, at least as far as the present invention is concerned, are (1) a cluster of four teat cups including (2) a clawpiece, (3) a suction pump and (4) a pulsator. Each teat cup contains an annular pulsation chamber defined between a rigid outer casing of the cup and a flexible inner liner which fits over one of the cow's teats.

In use, a steady pressure of approximately 50 kPa below atmosphere is continuously applied to the "core" space enclosed by the liner. Apart from encouraging a flow of milk into the core space, this negative pressure is also effective to clamp the teat liner on to the teat— this being referred to as "adhesion".

The pressure applied by the pulsator to the annular pulsation chamber, however, alternates between a first pulsation value of 50 kPa below atmospheric pressure and a second pulsation value of atmospheric pressure.

At the first pulsation value, there is zero differential across the liner, and milk is sucked from the teat into the core space. From the core space the milk is drawn down a flexible "short milk" tube into one of the four tubular "nipples" projecting upwardly from the interior volume of a special junction called a "clawpiece". From the clawpiece the milk is drawn through an outlet nippled and via a "long milk" tube to an appropriate receptacle or pipeline. The other three nipples of the clawpiece are connected to similar teat cups and thence to the other teats of the cow's udder.

At the second pulsation value, the liner collapses on the teat and the pressure applied by it to the teat causes cessation of milk flow and provides a necessary massage of the teat.

During normal operation, the pulsation pressure switches from one value to the other, with a cycle frequency which is typically once every second, giving rise to a correspondingly intermittent flow of milk.

In conventional milking machines, as used for the last sixty years or so, a small air bleed is provided in the clawpiece or in the short milk tubes to assist the transport of milk from the milking cluster to the receptacle or pipeline. More recently, it has been proposed to control udder disease by using one-way valves with the liner, within the short milk tubes or within the clawpiece to prevent flow back of milk towards the teat.

When such machines are operated without airbleeds in accordance with the teachings of GB 2159685, the teat liners are substantially sealed, during milking, from any supply of air to the milk-carrying core regions of the teat liners. Teat liners sealed in this way are hereinafter referred to as pneumatically-isolated teat liners and the method of milking produced, which has certain performance advantages over conventional milking, will hereinafter be referred to as hydraulic milking.

Whether intended for conventional or hydraulic milking, the mouthpiece of the liner is required to make an initial air-tight seal with the teat in order that the necessary vacuum can be established in the liner core so as to clamp the teat liner on to the teat. Thereafter, the teat is extended with pressure of milk from the udder and adhesion between the liner and the teat is principally confined to the barrel portion of the liner. Thus, the major effect of the teat in the liner is to occlude the passage between the mouthpiece of the liner and the main source of negative pressure beneath the teat. This means that the often high vacuums set up at the liner mouthpiece before adhesion is achieved, become isolated from the core space below the teat by the intimate contact of the liner barrel and the teat once adhesion is achieved. This isolation will normally persist until the milk flow reduces towards the end of the milking process. At this point, a connection is established between the mouth and barrel regions of the liner core and the accompanying reduction in teat size allows separation of the teat from the barrel portion of the liner core and the transfer of liner grip on the teat to the mouthpiece of the liner.

The effect of this prolonged vacuum at the liner's mouthpiece region is to cause swelling of the upper end of the teat with consequent discomfort to the cow.

According to a first aspect of the present invention, there is provided an automatic milking apparatus including regulating means operative automatically to maintain the uppermost region of the liner core at substantially atmospheric pressure throughout the milking process.

Conveniently, the regulating means is adapted to operate only when the uppermost region of the liner core is at less than atmospheric pressure.

The milking apparatus of the present invention may be used in either a hydraulic or conventional milking regime, as the case may be.

Conveniently, in preferred embodiments of the invention, the regulating means comprises a valve means whose operation is controlled by the pressure in a pulsation system for the teat liner.

Thus, the valve means may comprise a biased-closed pressure-responsive non-return valve which is automatically opened by the pressure in the pulsation system when this latter is at the atmospheric phase of the pulsation cycle, thereby to allow air at substantially atmospheric pressure to pass from the pulsation system to the uppermost core region of the teat liner when this latter region has negative pressure.

Conveniently, in this case, the valve means is positioned so as, when open, to allow air to pass to said liner region either direct from the pulsation chamber or from the clawpiece distributor or from the pulsator unit feeding the distributor.

Alternatively, in this same case, the valve means may be positioned so as, when open, to allow air at atmospheric pressure to pass direct from outside the teat cup to the uppermost region of the teat liner.

Conveniently, whichever system is used, there may be four such valve means, one servicing each teat cup (in the liner), or there may be a single such valve means (in the clawpiece, or at the pulsator unit) in which case it will service the whole milking cluster e.g. by a tube to each mouthpiece cavity.

Conveniently, the valve means is housed wholly within the teat cup.

Conveniently, the apparatus includes control means, automatically operative during the closing stages of milking in response to conditions at the teat, to admit air to a body portion of the liner core.

Conveniently, the control means operates by establishing communication between the uppermost region and the body portion of the liner core only during the closing stages of the milking process.

Conveniently, the control means is provided by the liner core, an intermediate region of which (lying between its uppermost region and its body portion) is operative to grip the teat during the main period of milking to provide adhesion and to release its grip on the teat during the closing stages of milking when the udder pressure and milk flow is low and the adhesion-providing grip of the liner on the teat has been transferred to the mouth region of the liner.

The invention also provides apparatus in which, during the main milking period, the teat liner is substantially sealed from any supply of air to the milk carrying body portion of the liner core.

According to a second aspect of the present invention, there is provided a method of automatic milking in which, during the main milking period, the teat liners are substantially sealed from any supply of air to the milk-carrying core regions of the teat liners to provide hydraulic milking whereas during the closing stages of milking, air is admitted to said regions to provide conventional milking.

Conveniently, the method includes the steps of applying negative pressure to a pneumatically-isolated teat liner core so as to clamp an intermediate region of the core onto the teat and thereby isolate the teat liner core's uppermost region (of which the mouthpiece cavity forms a part) from the body portion of the teat liner core, maintaining the uppermost region of the liner core at substantially atmospheric pressure throughout the milking process, and establishing communication between the uppermost region and the body portion of the liner core during the closing stages of the milking process as the clamping action of the intermediate region of the liner core on the teat is transferred to the mouth region of the liner core.

Conveniently, the step of maintaining the uppermost region of the liner core at substantially atmospheric pressure is performed by feeding said uppermost region with air from or regulated by a pulsation system for the teat liners when the pulsation system is at the atmospheric phase of the pulsation cycle.

It is an advantage of the method of the present invention that the change from hydraulic to conventional milking for each teat is responsive to conditions at that teat, the transfer of the clamping action taking place automatically as the size of the teat reduces towards the end of milking.

Thus, to summarise, it will be appreciated that during the main milking period, the preferred embodiments of the apparatus of the present invention function only to maintain atmospheric pressure in the upper region of the teat liner with little or no air flow past the teat. However, at the end of the main milking period, when udder pressure and milk flow is low, the barrel of the liner can no longer maintain adhesion with the teat and the adhesion-providing friction point is transferred to the mouthpiece of the liner. This means that the teat no longer occludes the passage of air from the mouthpiece to the main negative pressure source and air previously admitted only to the upper region of the liner core now has access to the body portion of the liner core to transport the milk. It follows that when operating according to the second aspect of the present invention, the method and apparatus of the present invention provide hydraulic milking during the main milking period and conventional milking at the close.

The main disadvantage associated with hydraulic milking is that is requires a somewhat complicated mechanism of air admission to facilitate removal of the cluster from the cow and clear the milk from the system at the end of milking. However, the method and apparatus of the present invention have performance benefits attributable to hydraulic milking without the disadvantages relating to cluster removal.

Other benefits are also expected from at least the preferred embodiments of the apparatus of the present invention; for example, the rings of raised tissue on the teats caused by mouthpiece vacuum with other milking systems are alleviated and teat end condition is improved because greater quantities of air admitted in the later part of the milking process allow suitable massage of the teat at a lowered vacuum in the liner region beneath the teat.

It is also to be noted that with the preferred embodiments of the present invention, the apparatus can be properly cleaned and disinfected during the normal cluster cleaning process of in-place circulation albeit with a suitable extension tube, if necessary, on the valve means.

Embodiments of the invention will now be described, by way of example only, with reference to the accompanying drawings, in which.

Figure 1:
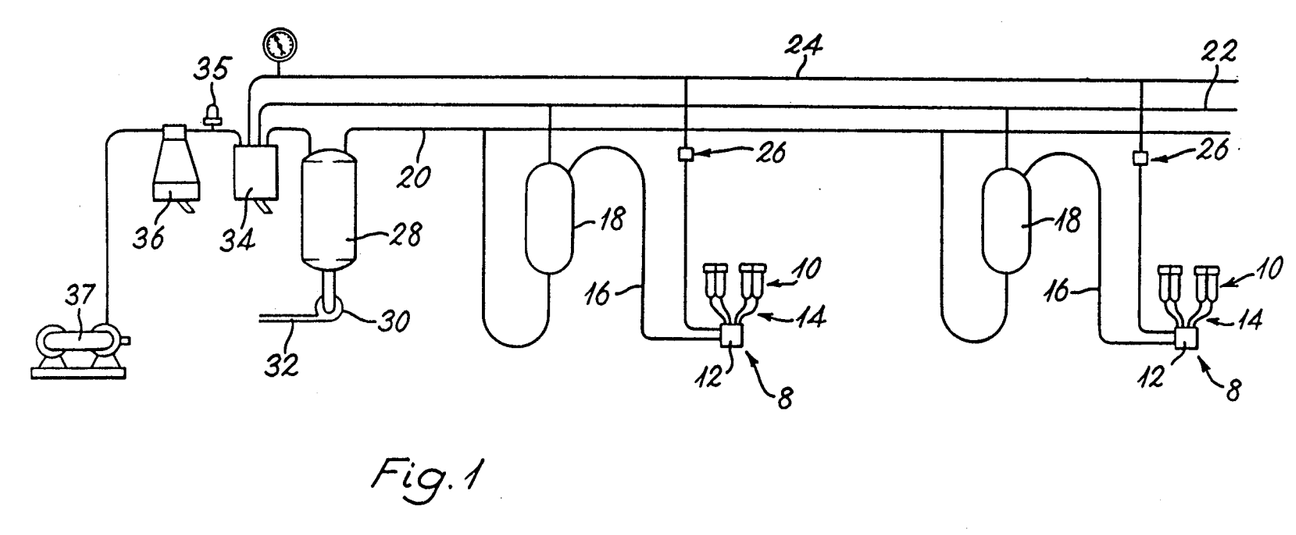
FIG. 1 shows a simplified and somewhat diagrammatic view of part of a typical hydraulic milking installation according to the present invention.

Thus referring first to FIG. 1, this figure shows, by way of illustration, only two milking units 8 although in practice there will typically be ten or so such units in an average-sized milking installation.

Each unit 8 consists basically of four teat cups 10, a clawpiece 12, four short milk tubes 14 connected the teat cups to the clawpiece, and a long milk tube 16 taking the milk from the clawpiece to a recorder jar 18 (or other milk measuring device).

Milk flow away from the teats, but not in the reverse direction, is allowed by one-way milk flow valves (not shown).

Conventional air-bleeds upstream of these one-way milk flow valves are omitted so that during normal operation, the installation will provide hydraulic milking. For further details of specific examples of these valves, and of hydraulic milking in general, reference should be made to British Patent No. 2159685 B (National Research Development Corporation).

The bottoms of the recorder jars 18 are connected to a common milk conveyance pipeline 20 although in an alternative embodiment (not shown), the jars 18 (or equivalent) are omitted and the long milk tubes 16 lead directly to the common milk conveyance pipeline 20.

Reference numeral 22 indicates the milking vacuum pipeline while reference numeral 24 indicates the air lien for the pulsator 26.

As shown, the common milk conveyance pipeline 20 leads to a receiver vessel 28 and in operation of the installation, a milk pump 30 operates to discharge milk from the vessel 28, via pipeline 32, to a bulk tank (not shown).

The installation further includes the usual sanitary trap 34, vacuum regulator 35, interceptor 36 and vacuum pump 37.

Figure 2:
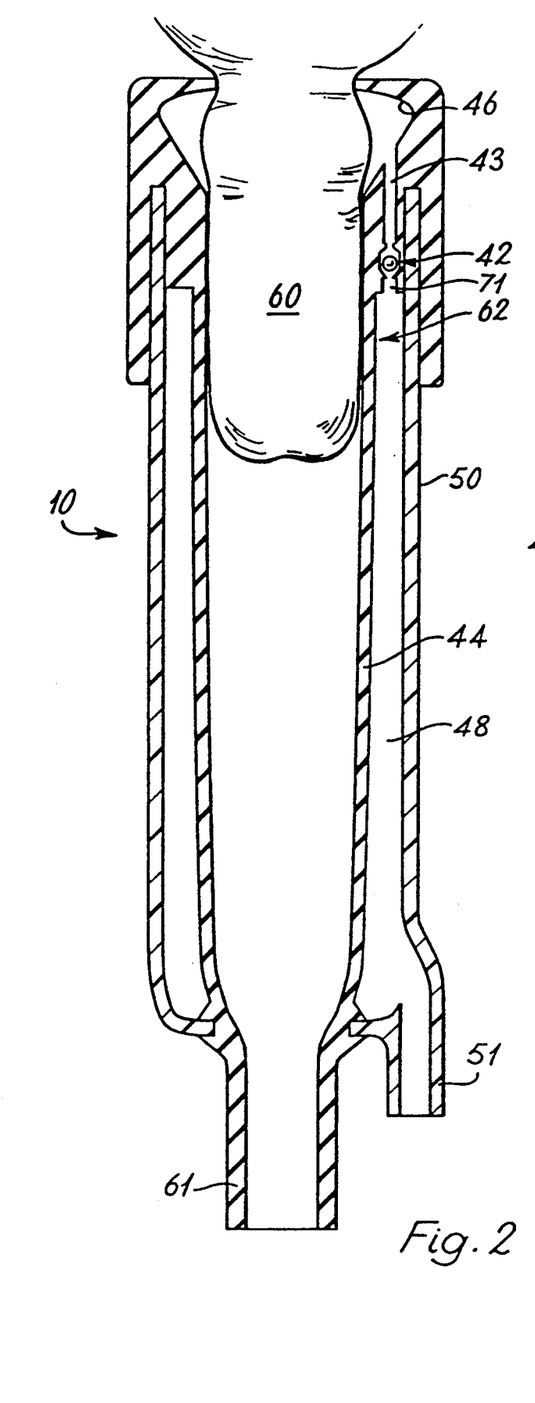
FIG. 2 shows a somewhat diagrammatic vertical section of one design of teat cup assembly for use in the installation of FIG. 1 or in an installation for conventional milking.
Figure 3:
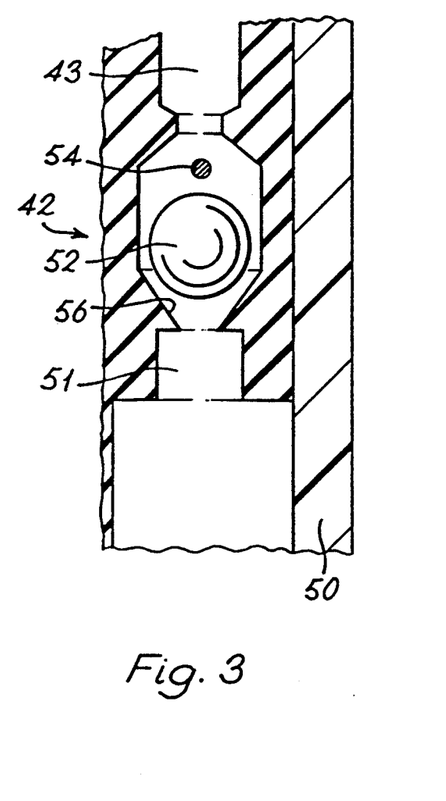
FIG. 3 shows, on a larger scale, part of the teat cup assembly illustrated in FIG. 2.

Turning now to FIGS. 2 and 3, which illustrate a preferred form of teat cup for use in the installation of FIG. 1, it will be seen that the teat cup 10 includes a one-way valve assembly 42 sited in a channel 43 in the liner 44. This channel connects the upper mouthpiece region 46 of the liner core with the annular pulsation chamber 48 formed by the cavity between the liner 44 and the teat cup shell 50. Reference numeral 51 indicates the pulsation chamber inlet connection.

The form of valve 42 may best be seen from FIG. 3 from which it will be observed that lower pressure above the valve will move the displaceable valve member (ball 52) upwards into engagement with a bar 54, thereby permitting an upward flow of air through the valve. An excess or equal pressure above the valve, however, will result in ball 52 moving downwards into engagement with a conical valve seating 56 to close the valve.

When, in operation, at one particular phase of the pulsation cycle, the pressure in the pulsation chamber 48 is atmospheric, the liner 44 will be in a collapsed state so that sufficient pressure is applied to the teat 60 to prevent milk flow. This collapse results from the fact that the pressure (atmospheric) outside the teat wall will currently exceed that within the liner core (50 kPa below atmospheric).

In practice, once region 46 is isolated from the liner core below the teat by the grip of the barrel on the teat, there is little tendency for a build up of negative pressure in region 46. However, the valve 42 will ensure that substantially atmospheric pressure will be maintained there even when the seal between the barrel and the teat becomes less effective and is eventually lost towards the end of milking.

However, at the other phase of the pulsation cycle, when there is (typically) a pressure of 50 kPa below atmospheric in the pulsation chamber 48, the pressures on either side of the liner wall are substantially equal and the liner will relax its pressure on the teat 60 to allow milk to flow from the teat and through the liner core outlet 61 to the associated short milk tube 14 etc.

At this stage, there is a higher pressure above the valve 42 (substantially atmospheric) than there is below it (50 kPa below atmospheric), so that the valve will remain closed to inhibit the leak of air at substantially atmospheric pressure from the upper most liner region 46 to the evacuated pulsation chamber 48.

As already explained with reference to British Patent 2159685 B, when no air bleeds are provided for the milk flow upstream of the one-way milk flow valves (wherever situated), the apparatus will normally work in a hydraulic milking regime.

However, whereas, during most of the milking process, adhesion is provides at location 62 where the liner 44 firmly grips the teat 60, due to the big difference in pressures above and below the teat 60, at a late stage in milking the teat becomes slack and this adhesion at location 62 is lost.

When this happens, the mouthpiece ring becomes the point of adhesion. This means that, henceforth, whenever atmospheric air is supplied to the mouthpiece region 46 during the "atmospheric" phase of the pulsation cycle, it will continue past the teat 60, into the liner 44 and on up the associated short milk tube 14 etc. At this stage, therefore, the apparatus is operating in a conventional milking regime.

At the end of milking, then, the milk is cleared from the cluster, and take off i.e. removal of the cluster from the cow, despite the one-way milk flow valves, can proceed normally as with a conventional milking regime.

Lastly, it should be noted that the wash tube extension (not shown), allows some beneficial leakage past the valve 42 during circulation cleaning when the clusters are inverted in wash jetters without fear of water violating the pulsation system.

Figure 4:
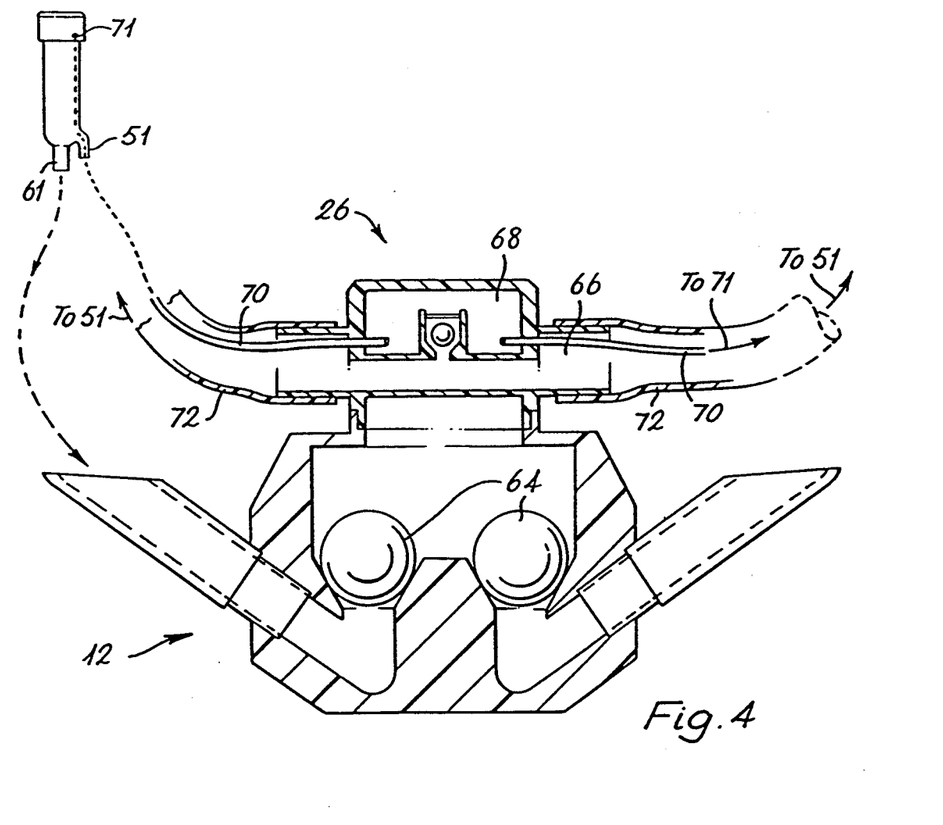
FIG. 4 is a somewhat diagrammatic vertical section of an alternative design of teat cup assembly to that shown in FIGS. 2 and 3.

FIG. 4 shows an alternative design of teat cup assembly in which a one-way valve 64 of similar or other type is provided in the distributor block of pulsator 26 between the pulsator distributor chamber 66 and an air bleed chamber 68.

An air tube 70 connects the bleed chamber 68 with the inlet (71) of the mouthpiece region 46 of the teat liner (as shown), while a similar tube 72 connects the distributor chamber 66 with the inlet 51 for the pulsation chamber 48 of the liner assembly.

In use, the valve 64 operates in a similar fashion to valve 42 in the earlier embodiment and functions, once again, to admit pulsation air at atmospheric pressure (from the bleed chamber 68 to the liner region 46).

Thus, the assembly of FIG. 4 will operate, as in the previously described embodiment, to provide hydraulic and then conventional milking regimes.

In a variation (not shown), a simulator and valve system can be arranged for air admission at the pulsation relay e.g. using an air transport tube which is continued to the relay on the stall work and connects with the air bleed chamber 68.

Figure 5:
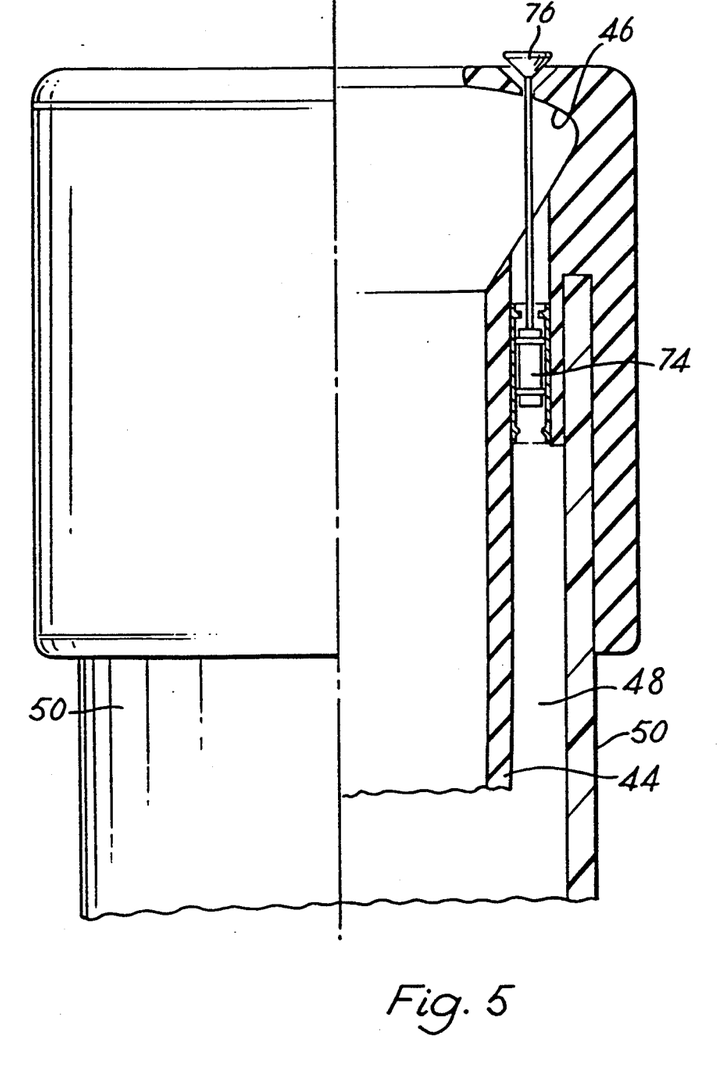
FIG. 5 is a somewhat diagrammatic vertical half-section of another alternative design of teat cup assembly.

FIG. 5 shows another alternative in which a first valve 74 is arranged to be operated by the pulsation chamber pressure to open and close a second valve 76 at the top end of the liner mouthpiece. When open, valve 76 will admit air at atmospheric pressure to the liner region 46 from outside the teat cup.

Once again, the teat cup assembly of FIG. 5 will function as does the first-described embodiment to provide hydraulic and then conventional milking regimes.

As already stated, the teat cup assemblies of FIGS. 2 to 5 may also be used in an installation for conventional milking which will be essentially as already described with respect to FIG. 1, except that some sort of permanent air bleed to the liner core is provided in accordance with the requirements of conventional milking e.g. at the milking cluster clawpiece.

Figure 6:
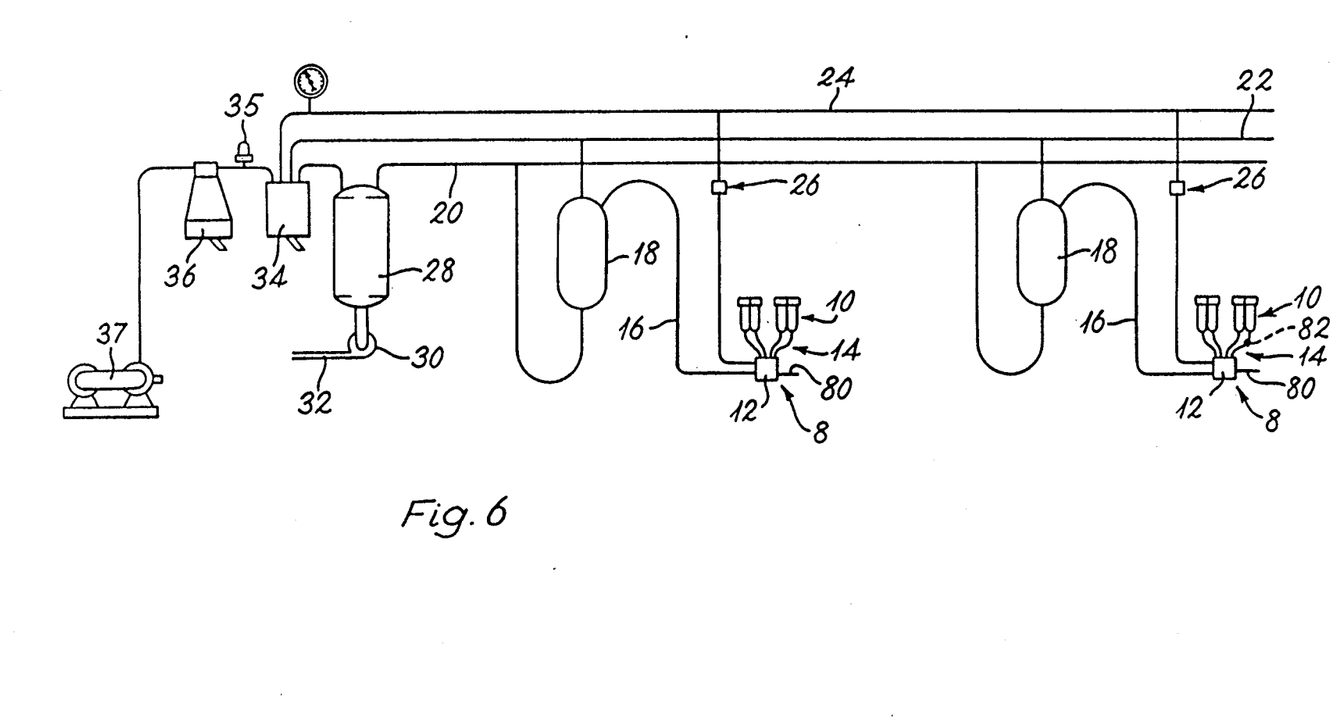
FIG. 6 shows a simplified and somewhat diagrammatic view of part of a typical installation for conventional milking according to the present invention.

FIG. 6 illustrates this modification, reference number 80 indicating the air bleeds.

As an alternative, it is envisaged that the air bleeds could be provided in the short milk tubes instead of in the clawpieces. For clarity, that is indicated (in broken line) by reference numeral 82 for only one of the short milk tubes in FIG. 6.

I claim:

1. An automatic milking apparatus or performing a milking process, said apparatus comprising:

a teat liner having an uppermost region and a body region below said uppermost region; and regulating means for altering a pressure of only said uppermost region to maintain said uppermost region pressure at a substantially atmospheric level during said milking process.

2. An apparatus as claimed in claim 1, wherein:

said regulating means alters said uppermost region pressure only when said uppermost region is at less than atmospheric pressure.

3. An apparatus as claimed in claim 2, said regulating means comprising:

valve means responsive to pressure in a pulsation system for said teat liner for maintaining said uppermost region pressure.

4. An apparatus as claimed in claim 3, said valve means comprising:

normally-closed, pressure-sensitive valve means disposed to open when said pressure in said pulsation system is at a substantially atmospheric level, wherein air substantially atmospheric pressure passes from said pulsation system to said uppermost region of said teat liner when said valve is open.

5. An apparatus as claimed in claim 4, wherein a pulsation chamber at least partially surrounds said teat liner:

said valve means is disposed to allow air to pass from said pulsation chamber directly to said uppermost region when said valve is open.

6. An apparatus as claimed in claim 4, wherein:

said valve means is disposed to allow air to pass to said uppermost region from one of a clawpiece distributor and a pulsator unit feeding said distributor when said valve is open.

7. An apparatus as claimed in claim 4, wherein:

said teat liner is disposed within a teat cup; and said valve means is disposed to allow air to pass from an area external to said teat cup directly to said uppermost region when said valve is open.

8. An apparatus as claimed in claim 3, wherein:

said valve means is disposed wholly within said teat cup.

9. An automatic milking apparatus as claimed in claim 1, said milking process having an initial milking process and a terminal milking process, wherein:

said teat liner comprises a body portion below said uppermost region; and said apparatus further comprises control means responsive to conditions at a cow teat disposed within said teat liner during said terminal milking process for admitting air to said body portion.

10. An apparatus as claimed in claim 9, wherein:

said control means establishes a connection between said uppermost region and said body portion only during said terminal milking process.

11. An apparatus as claimed in claim 9 or claim 10, said control means comprising:

first gripping means for gripping said teat during said initial milking process to provide adhesion and for releasing said teat during said terminal milking process when an udder pressure is low and a milk flow is low; and second gripping means for gripping said teat during said terminal milking process when said udder pressure is low and said milk flow is low; wherein said first gripping means comprises an intermediate region of said teat liner; and said second gripping means comprises a mouth region of said teat liner.

12. An apparatus as claimed in claim 1, said teat liner having a body portion below said uppermost region, said apparatus further comprising:

isolation means for providing a substantially airtight seal between said body portion and a region at atmospheric pressure.

13. A method of automatic milking in an automatic milking apparatus comprising teat liners having a body portion, said method comprising the steps of:

substantially eliminating air passages to said body portion, thereby providing a hydraulic milking process; and admitting air to said body portion, thereby providing a conventional milking process.

14. A method as claimed in claim 13, wherein said method further comprising:

an initial milking process; and a terminal milking process; wherein said eliminating step is performed during said initial milking process and said admitting step being performed during said terminal milking process.

15. A method as claimed in claim 14 comprising the steps of:

applying a below-atmospheric pressure to a pneumatically-isolated teat liner to clamp an intermediate region of said liner onto a teat and thereby isolate an uppermost region of said teat liner from said body portion;

maintaining said uppermost region at substantially atmospheric pressure throughout said processes;

clamping a mouth region of said teat liner onto said teat and unclamping said intermediate region of said teat liner from said teat; and establishing a connection between said uppermost region and said body portion during said terminal milking process.

16. A method as claimed in claim 13, said maintaining step comprising a step of:

feeding said uppermost region with air from or regulated by a pulsation system for said teat liner when said air is at a substantially atmospheric pressure level.

17. An automatic milking apparatus for performing a milking process, said apparatus comprising:

a teat liner having an uppermost region and a body region below said uppermost region; and regulating means for maintaining a pressure differential in said teat liner by altering a pressure of said uppermost region to maintain only said uppermost region pressure at a substantially atmospheric level when said body region is at a pressure substantially lower than said atmospheric level.

18. An automatic milking apparatus for performing a milking process, said apparatus comprising:

a cluster of teat cups, each of said teat cups comprising a rigid outer casing and a flexible inner liner, said liner having an uppermost region and a barrel region;

a pulsation chamber between said liner and said rigid outer casing of said teat cup;

supply means for supplying air at atmospheric pressure during said milking process; and normally-closed one-way valve regulating means connected to said supply means and said uppermost liner region for opening automatically throughout said milking process in response to a positive pressure differential across said valve means from said supply means to said uppermost region, wherein said regulating means automatically maintains only said uppermost region at substantially atmospheric pressure throughout said milking process irrespective of whether said flexible liner is gripping a teat at said uppermost region or at said barrel region.

* * * * *